United States Patent [19]
Takagi et al.

[11] Patent Number: 4,754,346
[45] Date of Patent: Jun. 28, 1988

[54] MUSIC SEARCHING DEVICE WITH TIME DEPENDENT SEARCH FUNCTION

[75] Inventors: Toshio Takagi; Tomomi Watanabe; Yuji Fukata; Hiroyuki Komata, all of Saitama, Japan

[73] Assignee: Pioneer Electronic Corporation, Tokyo, Japan

[21] Appl. No.: 933,447

[22] Filed: Nov. 21, 1986

[30] Foreign Application Priority Data

Nov. 21, 1985 [JP] Japan .................... 60-179621[U]

[51] Int. Cl.[4] ............................................. G11B 15/18
[52] U.S. Cl. .................................. 360/72.1; 360/74.4
[58] Field of Search ................ 360/69, 71, 72.1, 72.2, 360/72.3, 74.1, 74.2, 74.3, 74.4, 74.5, 74.6, 74.7

[56] References Cited

U.S. PATENT DOCUMENTS

| 4,463,393 | 7/1984 | Ueki et al. ................... 360/74.1 |
| 4,551,774 | 11/1985 | Sakaguchi et al. ........... 360/72.1 |
| 4,553,180 | 11/1985 | Hasegawa ..................... 360/74.1 |
| 4,649,442 | 3/1987 | Kunii et al. ................... 360/74.4 |

FOREIGN PATENT DOCUMENTS 54-51807  4/1979  Japan ................... 360/72.1

Primary Examiner—Raymond F. Cardillo
Assistant Examiner—David L. Robertson
Attorney, Agent, or Firm—Sughrue, Mion, Zinn, Macpeak & Seas

[57] ABSTRACT

A music search device for a tape containing a number of pieces of music. If the search begins within a fixed period since the beginning of the currently played piece, the tape jumps back to the beginning of the preceding piece. If the search begins after the fixed period, the tape jumps back to the beginning of the current piece.

4 Claims, 2 Drawing Sheets

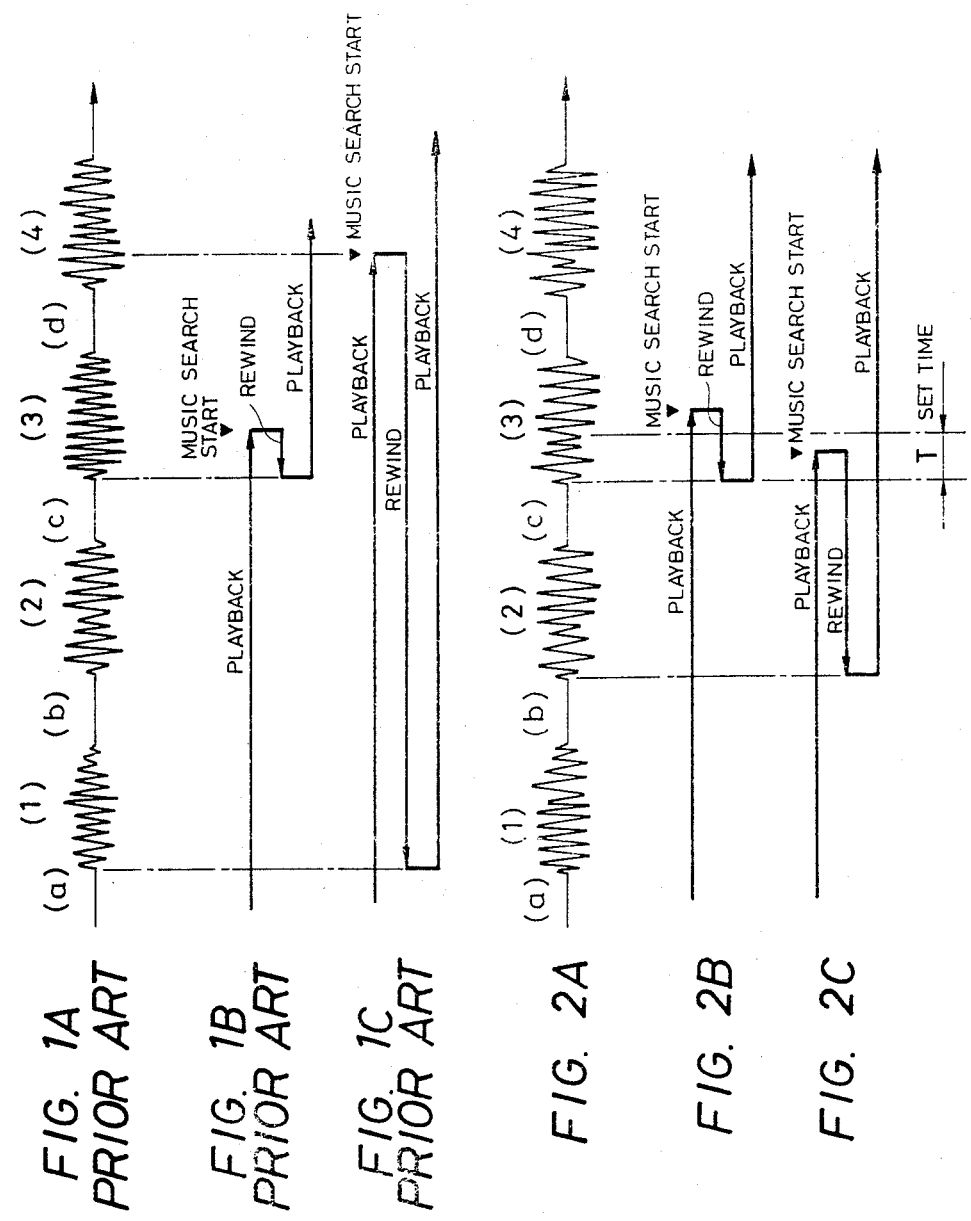

MUSIC SEARCHING DEVICE WITH TIME DEPENDENT SEARCH FUNCTION

BACKGROUND OF THE INVENTION

The present invention relates generally to a reproducing device for a magnetic tape, and more particularly to a music searching device for searching for a desired piece of music recorded on the magnetic tape while reproducing the same after rewinding the tape.

FIGS. 1A through 1C illustrate a procedure used by a conventional music searching device. In FIG. 1A, waveforms illustrated therein indicate a recorded condition on a magnetic tape whereon there are recorded a first music portion 1, a second music portion 2, a third music portion 3, and a fourth music portion 4. A non-recorded portion a is provided ahead of the first music portion 1 which will be referred to as a first inter-music portion. A second inter-music portion b is formed between the first and second music portions 1 and 2. A third inter-music portion c is formed between the second and third music portions 2 and 3, and a fourth inter-music portion d is formed between the third and fourth music portions 3 and 4. FIGS. 1B and 1C are time charts describing the running condition of the magnetic tape at the time of reproduction.

Referring to FIGS. 1A through 1C, the music searching method will be described. As indicated in FIG. 1B, if in the middle of reproducing the third music portion 3, the music search is carried out without designating a number of the music portions, the tape is rewound to the start position of the third music portion 3. Upon detection of the third inter-music portion c formed ahead of the third music portion 3, reproduction of the third music portion 3 is again performed. It should be noted that the searching operation is performed in a manner described above if the number of the music portions is not designated, and this operation is equivalent to the designation of zero (0) for the number of music portions.

As shown in FIG. 1C, the music search is performed by designating three (3) as the number of music portions so as to select the first music portion 1 in this case during reproduction of the fourth music portion 4. The tape will then be rewound past three music portions and to the start position of the first music portion 1. Upon detection of the first inter-music portion a, reproduction is started from the start position of the first music portion 1.

In the above-described conventional searching method, when the searching operation is performed without designating the number of music portions, the reproduction is only performed from the beginning of the music currently being reproduced. Accordingly, if the music being again played back is not the desired one, this operation would not be adequate. In order to playback a music portion prior to the currently reproduced music portion, it is necessary to randomly designate a certain number of music portions. In this case, the searching operation is complicated because the searching operation is initiated only after designating a certain number of music portions. Accordingly, in the case where the location of the desired music is unknown, it is necessary to randomly select a number of music portions and to search the desired music by consecutively reproducing several music portions. In this case, it is disadvantageous in that a search for the desired music cannot be quickly carried out.

SUMMARY OF THE INVENTION

Accordingly, it is an object of the invention to eliminate the foregoing disadvantages and to provide an improved music searching device which can search for a desired music portion recorded on a magnetic tape in a shorter time.

According to the present invention, in order to search a desired music portion by again winding the tape, the number of music portions to be rewound past can be changed depending upon whether or not the searching operation is performed within a predetermined time from the start of the music portion being currently reproduced.

BRIEF DESCRIPTION OF THE DRAWINGS

In the drawings:

FIG. 1A is a diagram illustrating a recording condition on a magnetic tape for description of the conventional device;

FIGS. 1B and 1C are diagrams illustrating the tape running conditions according to the conventional device;

FIG. 2A is a diagram illustrating a recording condition on a magnetic tape for description of the present invention;

FIGS. 2B and C are diagrams illustrating the tape running condition according to the present invention;

DESCRIPTION OF THE PREFERRED EMBODIMENTS

Figure 3:
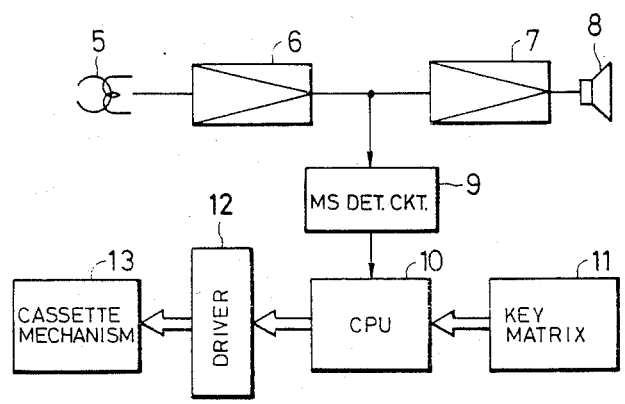
FIG. 3 is a block diagram illustrating a cassette tape reproducing device provided with a music searching function according to the present invention.

A preferred embodiment of the present invention will be described with reference to the accompanying drawings.

FIGS. 2A through 2C are similar to FIGS. 1A through 1C, respectively. Reference numerals 1–4 and reference characters a–d appearing in FIGS. 2A through 2C are similar to those described with reference to FIGS. 1A through 1C. According to the embodiment of the present invention, a prescribed time period T measured from the start of the music portion is set. When the searching operation is performed before the expiration of the time period T, the music portion preceding the one currently being reproduced is selected. When the searching operation is performed after the time period T has expired, then the currently reproduced music is again played back from the beginning.

More specifically, as shown in FIG. 2A, when the third music portion 3 is being played back and if after the time period T has expired, the search operation is performed, the tape is wound to the initial position of the music portion 3 being currently played back, i.e., the third music portion 3. Then, the playback is restarted upon detection of the third inter-music portion c.

Next, in the case where the searching operation is performed before expiration of the time period T during the playback of the third music portion 3, the tape is wound to the music portion 2 preceding the currently played back music, i.e., the second music portion 2. Upon detection of the second inter-music portion b, the second music is played back from the beginning. In this case, if it is determined within the time period T that the second music portion 2 is not the desired one, the searching operation may be performed once again so that the tape is further rewound to the preceding music portion, i.e., the first music portion 1. The first portion 1 from the beginning is played back upon detection of the first inter-music portion a. In this manner, the search for a desired music portion can be facilitated, since the preceding music portions can be reproduced one by one for a brief period of time. If the second music portion thus searched is the desired one, this music can be restarted from the beginning if the searching operation is performed again after expiration of the time period T.

Figure 4:
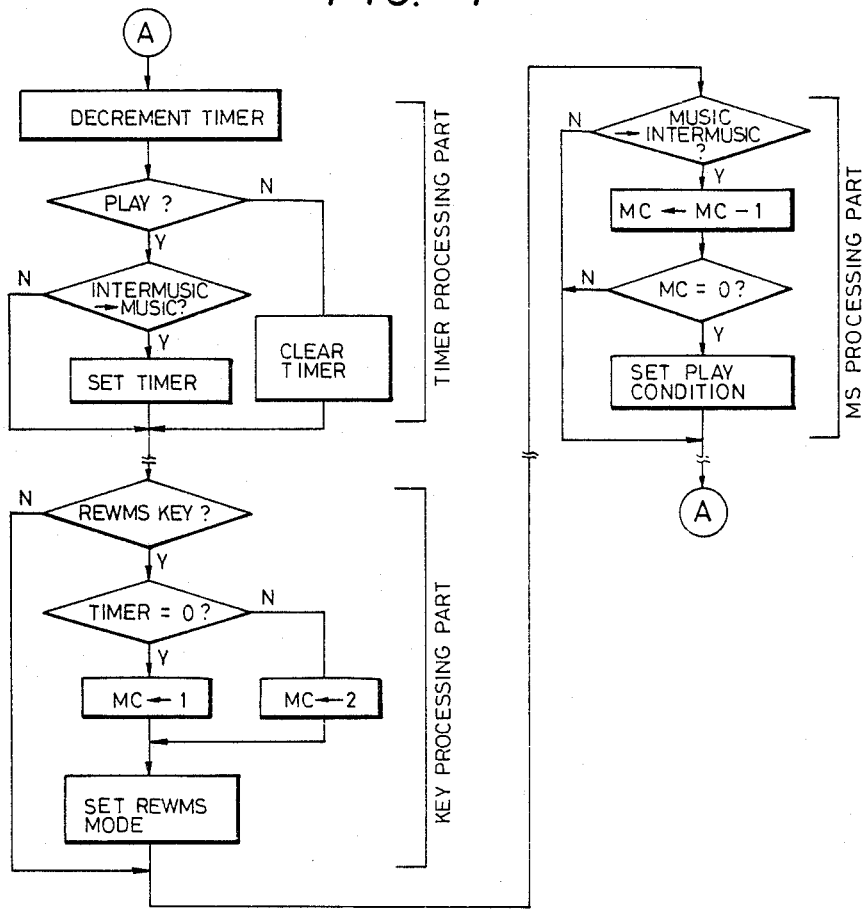
FIG. 4 is a flowchart illustrating the operation of the cassette tape reproducing device shown in FIG. 3.

FIG. 3 illustrates a block diagram of a cassette tape reproducing device having a searching function, and FIG. 4 illustrates a flow chart for describing the operation of the device shown in FIG. 3.

In FIG. 3, a playback head 5 picks up an audio signal on the magnetic tape and sends it to a head amplifier 6 for amplification. A main amplifier 7 receives the amplified output from the head amplifier 6 and further amplifies it and applies its output to a speaker 8. An IMS (inter music search) detection circuit 9 is provided to receive the output of the head amplifier 6, which detects an inter music portion from the audio signal. Such an IMS circuit 9 is disclosed by Ueki et al. in U.S. Pat. No. 4,404,604. In the rewind mode, this circuit determines when a non-recorded portion of the tape exceeds a predetermined minimum time. A CPU 10 receives the IMS signal and decodes it for processing to indicate that the inter music portion has been found. A key matrix 11 is connected to the CPU 10 and decodes signals, including the search operation command, from the operating panel. The key matrix 11 particularly decodes a rewind music search command REWMS from the operating panel. This command may be initiated by a dedicated key or by a double depression of the rewind key. A driver 12 is provided which is operated by the output of the CPU. A cassette mechanism 13 is driven by the driver 12 to move the magnetic tape.

FIG. 4 shows an execution sequence that the CPU 10 is continuously executing during both the play mode and the rewind music search mode. A timer, perhaps contained in the CPU 10, is first decremented. If the play mode is being executed for playing of the tape, then the IMS signal from the IMS detector circuit 9 is tested to determine if a transition from an inter music portion to a music portion has just occurred. If so, the timer is set to a time or count corresponding to the time T. Otherwise, the decremented timer is left as it is. If the play mode is not active, for instance, the rewind music search is being performed, the timer is cleared to zero. The timer cannot be decremented to a negative value so it will remain at zero in such instances.

Thereafter the rewind music search command REWMS from the key matrix 11 is tested. If the appropriate key has just previously been activated, a key processing portion is executed to begin the rewind music search. Since this key is not usually pressed again during the rewind music search, subsequent passes through this test during the rewind music search will provide a negative result.

If the timer is equal to zero, so that at least a time T has elapsed from the beginning of the music portion to the activation of the rewind music search mode, then a music counter MC is set to 1, indicating that the tape is to be rewound only to the beginning of the currently played music portion.

If the timer is not equal to zero, i.e. the time T has not elapsed, then the music counter MC is set to 2 indicating tape rewinding to the next prior music portion.

In either case, the rewind music search mode is set to begin rewinding the tape and the play mode is cancelled.

Thereafter, the IMS signal from the IMS detector circuit 9 is queried to determine if there has been a transition from a music portion to an inter music portion. If not, processing returns to the beginning of the loop, possibly through other unrelated steps. It is noted that this test often produces a negative result during its multiple execution during the rewind music search since insufficient time has elapsed to rewind the tape. Eventually, however, the music to inter music transition is detected.

When the transition is detected, the music counter MC is decremented by one. This change of value of the music counter MC has no effect in the play mode. If the music counter MC has been decremented to zero, indicating that no more rewinding is required in the rewind music search mode, then the rewind music search mode is revoked and the play mode is activated. Thereafter, the music portion is played beginning from the music portion determined by the initial setting of the music counter MC.

As described above, according to the preferred embodiment of the present invention, since the number of music portions to jump behind (rewind) can be automatically changed depending upon whether the search operation is performed within the prescribed period of time or not, the search operation can be facilitated. Specifically, if the head portion of the music being rewound past indicates the desired music, playback of that music may be continued. If not, the head portion of the preceding music can be played back to ascertain if it is the desired one. Accordingly, a search for a desired music portion can be carried out in a shorter time. In addition, unlike the conventional device in which the number of music portions to be rewound past is initially determined and then a searching operation is commenced, the operation of the music search is easier.

What is claimed is:

1. A music search device, comprising:
   a playback head for playing back signals recorded on a magnetic tape, said magnetic tape including a plurality of blocks of recorded information;
   means for detecting a beginning of playback of a currently played back block as said magnetic tape moves in a first direction;
   timer means initialized by said detecting means;
   means for generating a search operation command;
   means for moving said magnetic tape to the beginning of one of said blocks removed from said currently played back block by a first number of said blocks upon generation of said search operation command; and
   means for determining said first number of blocks according to a value of said timer means at the generation of said search operation command.

2. A music search device as recited in claim 1, wherein said means for moving moves said magnetic tape in a direction opposite said first direction.

3. A music search device as recited in claim 2,
   wherein said timer means is initialized to a predetermined time; and
   wherein said means for moving moves said tape to the beginning of said block currently being played if said predetermined time has expired in said timer means at the generation of said search operation command and moves said tape to the beginning of the block preceding said block being currently played back if said predetermined time has not expired at the generation of said search operation command.

4. A music search device as recited in claim 3, wherein said playback head is adapted for playing back said blocks in said first direction of said tape after said means for moving moves said tape.

* * * * *